«12» United States Patent
Kalia et al.

(10) Patent No.: US 7,814,458 B2
(45) Date of Patent: Oct. 12, 2010

(54) DYNAMIC EDITING SUPPORT AND VALIDATION OF APPLICATION SPECIFIC INFORMATION ON BUSINESS OBJECTS

(75) Inventors: Suman Kumar Kalia, Maple (CA); John H. Green, Toronto (CA); Damian Sarkiss Stuart Hagge, Aurora (CA); Hamzeh Zawawy, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1293 days.

(21) Appl. No.: 11/295,934

(22) Filed: Dec. 7, 2005

(65) Prior Publication Data
US 2006/0122961 A1    Jun. 8, 2006

(30) Foreign Application Priority Data
Dec. 7, 2004    (CA)  .................................... 2489628

(51) Int. Cl.
*G06F 9/45*    (2006.01)
*G06F 17/00*    (2006.01)
(52) U.S. Cl. ...................... 717/104; 717/102; 717/106; 717/114; 717/116; 715/234
(58) Field of Classification Search .................... 707/1, 707/6, 10, 102, 103, 104.1, 200; 717/102, 717/103, 106, 109, 115
See application file for complete search history.

(56) References Cited
U.S. PATENT DOCUMENTS

| 5,353,401 | A | * | 10/1994 | Iizawa et al. ................. 715/763 |
| 5,794,030 | A | * | 8/1998 | Morsi et al. ............. 707/103 R |
| 6,061,515 | A | * | 5/2000 | Chang et al. ................. 717/114 |
| 2003/0037038 | A1 | * | 2/2003 | Block et al. ..................... 707/1 |
| 2003/0120665 | A1 | * | 6/2003 | Fox et al. ..................... 707/100 |
| 2003/0149957 | A1 | * | 8/2003 | Daniels et al. ............. 717/102 |
| 2003/0177481 | A1 | * | 9/2003 | Amaru et al. ............... 717/148 |
| 2003/0182457 | A1 | * | 9/2003 | Brewin ....................... 709/310 |
| 2003/0204511 | A1 | * | 10/2003 | Brundage et al. ........... 707/100 |
| 2004/0128276 | A1 | * | 7/2004 | Scanlon et al. ................. 707/1 |
| 2004/0201600 | A1 | * | 10/2004 | Kakivaya et al. ............ 345/700 |
| 2005/0039124 | A1 | * | 2/2005 | Chu et al. ................... 715/531 |
| 2005/0114394 | A1 | * | 5/2005 | Kaipa et al. ............. 707/104.1 |

FOREIGN PATENT DOCUMENTS

WO    2004040420 A2    5/2004

OTHER PUBLICATIONS

Thompson et al., XML Schema Part 1—Structures, Feb. 5, 2001, W3C, 145 pages.*

* cited by examiner

*Primary Examiner*—Tuan Q Dam
*Assistant Examiner*—Jonathan R Labud
(74) *Attorney, Agent, or Firm*—Steven L. Nichols; Vancott, Bagley, Cornwell & McCarthy PC

(57) ABSTRACT

Interface code is produced to use services of an enterprise information system. An application specific information schema is provided that defines the format and shape of application specific information usable in a business object schema defining the business object and the application specific information for the enterprise information system. An enterprise metadata discovery schema is also provided for anchoring the application specific information schema to complex type, element, attribute and the business object schema. The business object schema is generated using a metatdata editor. The interface code is produced using the business object schema.

15 Claims, 11 Drawing Sheets emdSchema eisSchema

5000 businessObjectSchema emdSchema eisSchema

5000 businessObjectSchema

```
<?xml version="1.0" encoding="UTF-8"?>
<xs:schema targetNamespace="http://commonj.emd/asi"
           xmlns:emd="http://commonj.emd/asi"
           xmlns:xs="http://www.w3.org/2001/XMLSchema">

<xs:element name="annotationSet">
        <xs:annotation>
            <xs:documentation>
                ASI anchor which is used on the business object schema
                element declaration. The asiNSURI must be specified; it
                identifies the namespace of the ASI schema. The
                asiSchemaLocation is an optional hint that can be used to
                identify the location of the ASI schema.
            </xs:documentation>
        </xs:annotation>
        <xs:complexType>
            <xs:complexContent>
                <xs:restriction base="xs:anyType">
                    <xs:attribute name="asiNSURI" type="xs:anyURI"/>
                    <xs:attribute name="asiSchemaLocation" type="xs:anyURI" use="optional"/>
                </xs:restriction>
            </xs:complexContent>
        </xs:complexType>
    </xs:element>

<xs:simpleType name="annotationKind">
        <xs:annotation>
                <xs:documentation>
                    Specifies the kind of the annotation anchor, which can be
                    complexType, element or attribute.
                </xs:documentation>
        </xs:annotation>
        <xs:restriction base="xs:string">
            <xs:enumeration value="complexType"/>
            <xs:enumeration value="element"/>
            <xs:enumeration value="attribute"/>
        </xs:restriction>
    </xs:simpleType>

<xs:simpleType name="annotationScope">
        <xs:annotation>
                <xs:documentation>
                    Specifies the scope of the annotationKind ie
                    whether it is applicable to local or global
                    constructs of schema (eg. local elements or global
                    elements).
                </xs:documentation>
        </xs:annotation>
        <xs:restriction base="xs:string">
            <xs:enumeration value="local"/>
            <xs:enumeration value="global"/>
            <xs:enumeration value="both"/>
        </xs:restriction>
    </xs:simpleType>
```

FIGURE 2A

```
2058        <xs:element name="annotationType">
2059           <xs:annotation>
2060              <xs:documentation>
2061                 Identifies the anchor point for complexType, element or
2062                 attribute ASI schema. Located as appinfo on global
2063                 elements in the provider ASI schema. The global element's
2064                 type describes the ASI. The appinfo on the global element
2065                 identifies where the ASI can be used.
2066                 The annotationKind must be specified and associates the
2067                 ASI being described to the XSD component it can be used
2068                 with.
2069                 The annotationScope is optional.  If it is not used then
2070                 the ASI can be used on global and local declarations.  If
2071                 it is specified the ASI is scoped to either being used on
2072                 global or local declarations.
2073              </xs:documentation>
2074           </xs:annotation>
2075           <xs:complexType>
2076              <xs:complexContent>
2077                 <xs:restriction base="xs:anyType">
2078                    <xs:attribute name="annotationKind"
2079 type="emd:annotationKind"/>
2080                    <xs:attribute name="annotationScope"
2081 type="emd:annotationScope" default="both" use="optional"/>
2082                 </xs:restriction>
2083              </xs:complexContent>
2084           </xs:complexType>
2085        </xs:element>
2086
2087 </xs:schema>
```

FIGURE 2B

```xml
<?xml version="1.0" encoding="UTF-8"?>
<schema targetNamespace="http://www.eis1.com/asi"
        xmlns:eis1="http://www.eis1.com/asi"
        xmlns="http://www.w3.org/2001/XMLSchema">

<element name="BusinessObjectASI"
type="eis1:BusinessObjectASIType">
            <annotation>
                    <appinfo source="http://commonj.emd/asi">
                            <emd:annotationType
xmlns:emd="http://commonj.emd/asi" annotationKind="complexType"
annotationScope="global" />
                    </appinfo>
            </annotation>
    </element>

<complexType name="BusinessObjectASIType">
            <sequence>
                    <element name="ObjectName" type="string" />
            </sequence>
    </complexType>

<element name="ElementASI" type="eis1:ElementASIType">
            <annotation>
                    <appinfo source="http://commonj.emd/asi">
                            <emd:annotationType
xmlns:emd="http://commonj.emd/asi" annotationKind="element"
annotationScope="local" />
                    </appinfo>
            </annotation>
    </element>

<complexType name="ElementASIType">
            <sequence>
                    <element name="getMethodName" type="string" />
                    <element name="setMethodName" type="string" />
            </sequence>
    </complexType>
</schema>
```

FIGURE 3

```xml
<?xml version="1.0" encoding="UTF-8"?>
<schema targetNamespace="http://www.eis2.com/asi"
        xmlns:eis2="http://www.eis2.com/asi"
        xmlns="http://www.w3.org/2001/XMLSchema">

<element name="BusinessObjectASI"
    type="eis2:BusinessObjectASIType">
            <annotation>
                    <appinfo source="http://commonj.emd/asi">
                            <emd:annotationType
    xmlns:emd="http://commonj.emd/asi" annotationKind="complexType"/>
                    </appinfo>
            </annotation>
    </element>
    <complexType name="BusinessObjectASIType">
            <sequence>
                    <element name="ObjectName" type="string" />
            </sequence>
    </complexType>

<element name="ElementASI" type="eis2:ElementASIType">
            <annotation>
                    <appinfo source="http://commonj.emd/asi">
                            <emd:annotationType
    xmlns:emd="http://commonj.emd/asi" annotationKind="element"
    annotationScope="local" />
                    </appinfo>
            </annotation>
    </element>
    <complexType name="ElementASIType">
            <sequence>
                    <element name="fieldName" type="string" />
                    <element name="fieldType" type="string" />
            </sequence>
    </complexType>

<element name="AttributeASI" type="eis2:AttributeASIType">
            <annotation>
                    <appinfo source="http://commonj.emd/asi">
                            <emd:annotationType
    xmlns:emd="http://commonj.emd/asi" annotationKind="attribute"
    annotationScope="local" />
                    </appinfo>
            </annotation>
    </element>
    <complexType name="AttributeASIType">
            <sequence>
                    <element name="fieldName" type="string" />
                    <element name="fieldType" type="string" />
            </sequence>
    </complexType>

</schema>
```

FIGURE 4

```
5600    <?xml version="1.0" encoding="UTF-8"?>
5601    <schema xmlns="http://www.w3.org/2001/XMLSchema"
5602            xmlns:po="http://www.ibm.com"
5603            targetNamespace="http://www.ibm.com">
5604
5605        <annotation>
5606            <documentation xml:lang="en">
5607                    Purchase order schema example from XML Schema Part 0:
5608                    Primer Copyright 2001, IBM Corp.
5609                    All rights reserved Copyright 2001, World Wide Web
5610                    Consortium, (Massachusetts Institute of Technology,
5611                    Institut National de Recherche en Informatiqueet en
5612                    Automatique, Keio University). All Rights Reserved.
5613            </documentation>
5614
5615            <appinfo source="http://commonj.emd/asi">
5616                    <emd:annotationSet xmlns:emd="http://commonj.emd/asi"
5617    asiNSURI="http://www.eis1.com/asi"
5618                    asiSchemaLocation="eis1Schema.xsd"/>
5619            </appinfo>
5620
5621            <appinfo source="http://commonj.emd/asi">
5622                    <emd:annotationSet xmlns:emd="http://commonj.emd/asi"
5623    asiNSURI="http://www.eis2.com/asi"
5624                    asiSchemaLocation="eis2Schema.xsd"/>
5625            </appinfo>
5626
5627        </annotation>
5628
5629        <element name="purchaseOrder" type="po:PurchaseOrderType"/>
5630        <element name="comment" type="string"/>
5631
5632        <complexType name="PurchaseOrderType">
5633            <annotation>
5634                    <appinfo source="http://www.eis1.com/asi">
5635                            <ns1:BusinessObjectASI
5636    xmlns:ns1="http://www.eis1.com/asi">
5637
5638            <ns1:ObjectName>eis1.PurchaseOrder1</ns1:ObjectName>
5639                    </ns1:BusinessObjectASI>
5640                    </appinfo>
5641            </annotation>
5642            <sequence>
5643                    <element name="shipTo" type="po:USAddress">
5644                            <annotation>
5645                                    <appinfo source="http://www.eis1.com/asi">
5646                                            <ns1:ElementASI
5647    xmlns:ns1="http://www.eis1.com/asi">
5648
5649        <ns1:getMethodName>getShipToAddress</ns1:getMethodName>
5650
5651        <ns1:setMethodName>setShipToAddress</ns1:setMethodName>
5652                                    </ns1:ElementASI>
5653                                    </appinfo>
5654                                    <appinfo source="http://www.eis2.com/asi">
5655                                            <ns2:ElementASI
5656    xmlns:ns2="http://www.eis2.com/asi">
```

FIGURE 5A

```
            <ns2:fieldName>shipAddress</ns2:fieldName>

<ns2:fieldType>shipAddressType</ns2:fieldType>
                                </ns2:ElementASI>
                            </appinfo>
                        </annotation>
                    </element>
                    <element name="billTo" type="po:USAddress">
                        <annotation>
                            <appinfo source="http://www.eis1.com/asi">
                                <ns1:ElementASI
xmlns:ns1="http://www.eis1.com/asi">

<ns1:getMethodName>getBillToAddress</ns1:getMethodName>

<ns1:setMethodName>setBillToAddress</ns1:setMethodName>
                                </ns1:ElementASI>
                            </appinfo>
                        </annotation>
                    </element>
                    <element minOccurs="0" ref="po:comment">
                        <annotation>
                            <appinfo source="http://www.eis1.com/asi">
                                <ns1:ElementASI
xmlns:ns1="http://www.eis1.com/asi">

<ns1:getMethodName>getComment</ns1:getMethodName>

<ns1:setMethodName>setComment</ns1:setMethodName>
                                </ns1:ElementASI>
                            </appinfo>
                        </annotation>
                    </element>
                    <element name="items" type="po:Items">
                        <annotation>
                            <appinfo source="http://www.eis1.com/asi">
                                <ns1:ElementASI
xmlns:ns1="http://www.eis1.com/asi">

<ns1:getMethodName>getItems</ns1:getMethodName>

<ns1:setMethodName>setItems</ns1:setMethodName>
                                </ns1:ElementASI>
                            </appinfo>
                        </annotation>
                    </element>
                </sequence>
                <attribute name="orderDate" type="date"/>
            </complexType>
            <complexType name="USAddress">
                <annotation>
                    <appinfo source="http://www.eis1.com/asi">
                        <ns1:BusinessObjectASI
xmlns:ns1="http://www.eis1.com/asi">

<ns1:ObjectName>eis1.USAddress</ns1:ObjectName>
```

FIGURE 5B

```
5600                    </ns1:BusinessObjectASI>
5601                  </appinfo>
5602               </annotation>
5603               <sequence>
5604                  <element name="first_name" type="string">
5605                     <annotation>
5606                        <appinfo source="http://www.eis1.com/asi">
5607                           <ns1:ElementASI
5608     xmlns:ns1="http://www.eis1.com/asi">
5609
5610         <ns1:getMethodName>getFirstName</ns1:getMethodName>
5611
5612         <ns1:setMethodName>setFirstName</ns1:setMethodName>
5613                           </ns1:ElementASI>
5614                        </appinfo>
5615                     </annotation>
5616                  </element>
5617                  <element name="last_name" type="string">
5618                     <annotation>
5619                        <appinfo source="http://www.eis1.com/asi">
5620                           <ns1:ElementASI
5621     xmlns:ns1="http://www.eis1.com/asi">
5622
5623         <ns1:getMethodName>getLastName</ns1:getMethodName>
5624
5625         <ns1:setMethodName>setLastName</ns1:setMethodName>
5626                           </ns1:ElementASI>
5627                        </appinfo>
5628                     </annotation>
5629                  </element>
5630                  <element name="street" type="string">
5631                     <annotation>
5632                        <appinfo source="http://www.eis1.com/asi">
5633                           <ns1:ElementASI
5634     xmlns:ns1="http://www.eis1.com/asi">
5635
5636         <ns1:getMethodName>getStreet</ns1:getMethodName>
5637
5638         <ns1:setMethodName>setStreet</ns1:setMethodName>
5639                           </ns1:ElementASI>
5640                        </appinfo>
5641                     </annotation>
5642                  </element>
5643                  <element name="city" type="string">
5644                     <annotation>
5645                        <appinfo source="http://www.eis1.com/asi">
5646                           <ns1:ElementASI
5647     xmlns:ns1="http://www.eis1.com/asi">
5648
5649         <ns1:getMethodName>getCity</ns1:getMethodName>
5650
5651         <ns1:setMethodName>setCity</ns1:setMethodName>
5652                           </ns1:ElementASI>
5653                        </appinfo>
5654                     </annotation>
5655                  </element>
5656                  <element name="state" type="string">
```

FIGURE 5C

```
                            <annotation>
                                    <appinfo source="http://www.eis1.com/asi">
                                            <ns1:ElementASI
xmlns:ns1="http://www.eis1.com/asi">

<ns1:getMethodName>getState</ns1:getMethodName>

<ns1:setMethodName>setState</ns1:setMethodName>
                                            </ns1:ElementASI>
                                    </appinfo>
                            </annotation>
                    </element>
                    <element name="zip" type="string">
                            <annotation>
                                    <appinfo source="http://www.eis1.com/asi">
                                            <ns1:ElementASI
xmlns:ns1="http://www.eis1.com/asi">

<ns1:getMethodName>getZip</ns1:getMethodName>

<ns1:setMethodName>setZip</ns1:setMethodName>
                                            </ns1:ElementASI>
                                    </appinfo>
                            </annotation>
                    </element>
            </sequence>
            <attribute fixed="US" name="country" type="NMTOKEN"/>
    </complexType>
    <complexType name="Items">
            <annotation>
                    <appinfo source="http://www.eis1.com/asi">
                            <ns1:BusinessObjectASI
xmlns:ns1="http://www.eis1.com/asi">
                                    <ns1:ObjectName>eis1.Items</ns1:ObjectName>
                            </ns1:BusinessObjectASI>
                    </appinfo>
            </annotation>
            <sequence>
                    <element maxOccurs="unbounded" minOccurs="0"
name="item">
                            <annotation>
                                    <appinfo source="http://www.eis1.com/asi">
                                            <ns1:ElementASI
xmlns:ns1="http://www.eis1.com/asi">

<ns1:getMethodName>getItem[int]</ns1:getMethodName>

<ns1:setMethodName>setItem[int]</ns1:setMethodName>
                                            </ns1:ElementASI>
                                    </appinfo>
                            </annotation>
                            <complexType>
                                    <sequence>
                                            <element name="partNum" type="string">
                                                    <annotation>
                                                            <appinfo
source="http://www.eis1.com/asi">
```

FIGURE 5D

```
                                                            <ns1:ElementASI
      xmlns:ns1="http://www.eis1.com/asi">

<ns1:getMethodName>getPartNum</ns1:getMethodName>

<ns1:setMethodName>setPartNum</ns1:setMethodName>
                                                            </ns1:ElementASI>
                                                         </appinfo>
                                                      </annotation>

</element>
                                              <element name="productName"
      type="string">
                                                  <annotation>
                                                      <appinfo
      source="http://www.eis1.com/asi">
                                                            <ns1:ElementASI
      xmlns:ns1="http://www.eis1.com/asi">

<ns1:getMethodName>getProductName</ns1:getMethodName>

<ns1:setMethodName>setProductName</ns1:setMethodName>
                                                            </ns1:ElementASI>
                                                         </appinfo>
                                                      </annotation>

</element>
                                              <element name="quantity">
                                                  <annotation>
                                                      <appinfo
      source="http://www.eis1.com/asi">
                                                            <ns1:ElementASI
      xmlns:ns1="http://www.eis1.com/asi">

<ns1:getMethodName>getQuantity</ns1:getMethodName>

<ns1:setMethodName>setQuantity</ns1:setMethodName>
                                                            </ns1:ElementASI>
                                                         </appinfo>
                                                      </annotation>

<simpleType>
                                                      <restriction base="int">
                                                         <maxExclusive
      value="100"/>
                                                      </restriction>
                                                  </simpleType>
                                              </element>
                                              <element name="USPrice"
      type="decimal">
                                                  <annotation>
                                                      <appinfo
      source="http://www.eis1.com/asi">
                                                            <ns1:ElementASI
      xmlns:ns1="http://www.eis1.com/asi">

<ns1:getMethodName>getPrice</ns1:getMethodName>
```

FIGURE 5E

```
5600
5601            <ns1:setMethodName>setPrice</ns1:setMethodName>
5602                                            </ns1:ElementASI>
5603                                        </appinfo>
5604                                    </annotation>
5605
5606                                </element>
5607                                <element minOccurs="0"
5608    ref="po:comment">
5609                                </element>
5610                                <element minOccurs="0" name="shipDate"
5611    type="string">
5612                                    <annotation>
5613                                        <appinfo
5614    source="http://www.eis1.com/asi">
5615                                            <ns1:ElementASI
5616    xmlns:ns1="http://www.eis1.com/asi">
5617
5618            <ns1:getMethodName>getShipDate</ns1:getMethodName>
5619
5620            <ns1:setMethodName>setShipDate</ns1:setMethodName>
5621                                            </ns1:ElementASI>
5622                                        </appinfo>
5623                                    </annotation>
5624
5625                                </element>
5626                            </sequence>
5627
5628                        </complexType>
5629                    </element>
5630                </sequence>
5631            </complexType>
5632            <simpleType name="SKU">
5633                <restriction base="string"/>
5634            </simpleType>
5635    </schema>
```

FIGURE 5F

DYNAMIC EDITING SUPPORT AND VALIDATION OF APPLICATION SPECIFIC INFORMATION ON BUSINESS OBJECTS

BACKGROUND OF THE INVENTION

The present invention generally relates to application integration, and more particularly, to a tooling framework for supporting validation and editing of binding information for facilitating application integration.

Modern data processing systems often use Enterprise Information Systems (EIS) applications to provide the information infrastructure for an organization. An EIS provides services to clients via interfaces, whether local, remote or both. Resources provided to clients may include: a business object from an Enterprise Resource Planning (ERP) System; data stored in a database system; and data from transaction program in a transaction processing system.

If it is necessary to access these services remotely, one may turn to Web services, Java™ 2 Platform, Enterprise Edition (J2EE) Messaging or J2EE Connector Architecture using a resource adapter (Java is a trademark of Sun Microsystems Inc. in the United States, other countries, or both). Data in a canonical form such as an Extensible Markup Language (XML) document or Java bean is exchanged. Schema (XSD files) are usually used in order to capture type information for these services.

In general, metadata is information which describes a program's interfaces (type mapping information, data structures, message formats). Extraction of metadata from a program is necessary so that appropriate connectors and adapters can be created. In this context, metadata may capture binding information that can be used to transform data in a canonical form (an XML document or Java bean generated from the schema describing the type) to the native form expected by the EIS. For example, binding information would enable transforming an XML document or a J2EE CCI Record to the native Object used in a Peoplesoft system.

This makes process and web portal development very time consuming. In prior art systems, binding information for types has been captured in proprietary formats. For example, IBM® WebSphere® Studio Application Developer Integration Edition captures binding information in Web Service Definition Language (WSDL) using a format typeMapping WSDL extensibility element. It then delegates the generation of the transform to a generator that had to be supplied by the EIS. Any editing of the binding information was done by supplying a custom editing support. CrossWorlds® Object Discovery Agent and Business Object Editor supported binding information by treating it as an opaque string. The developer has to be knowledgeable about the syntax of the binding in order to make any changes. IBM, CrossWorlds and WebSphere are trademarks of International Business Machines Inc in the United States, other countries, or both.

BRIEF SUMMARY OF THE INVENTION

According to a one aspect of the present invention, a method for producing interface code to use services of an enterprise information system comprises providing an application specific information schema defining the format and shape of application specific information usable in a business object schema defining the business object and the application specific information for the enterprise information system, providing an enterprise metadata discovery schema for anchoring the application specific information schema to complex type, element, attribute and the business object schema, generating the business object schema using a metatdata editor and generating the interface code using the business object schema.

According to another aspect of the present invention, a system for producing interface code to use services of an enterprise information system, comprises an application specific information schema defining the format and shape of application specific information usable in a business object schema defining the business object and the application specific information for the enterprise information system, an enterprise metadata discovery schema for anchoring the application specific information schema to complex type, element, attribute and the business object schema, a metadata editor for generating the business object schema, and a generator for generating the interface code using the business object schema.

According to yet another aspect of the present invention, a tooling framework for dynamic editing support and validation of application specific information on a business object for using services of an enterprise information system comprises a business object schema defining the business object and the application specific information, an application specific information schema defining the format and shape of the application specific information usable in the business object schema for the enterprise information system, and an enterprise metadata discovery schema for anchoring the application specific information schema to complex type, element and attribute, and anchoring the application specific information schema to the business object schema.

According a still further aspect of the present invention, a computer program product for producing interface code to use services of an enterprise information system comprises a computer usable medium having computer useable program code embodied therein. The computer useable program code comprises computer usable program code configured to provide an application specific information schema defining the format and shape of application specific information usable in a business object schema defining the business object and the application specific information for the enterprise information system, computer usable program code configured to provide an enterprise metadata discovery schema for anchoring the application specific information schema to complex type, element, attribute, and the business object schema, computer usable program code configured to generate the business object schema using a metatdata editor, and computer usable program code configured to generate the interface code using the business object schema.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIGS. 2A to 2B depict the contents of an example emdSchema schema file according to an aspect of this invention.

FIGS. 3 and 4 depict each the content of an example eisSchema schema file according to an aspect of this invention of FIG. 2.

FIGS. 5A to 5F taken together depict the contents of an example businessObjectSchema file according to an aspect of this.

DETAILED DESCRIPTION OF THE INVENTION

Figure 1:
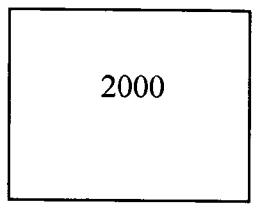
FIG. 1 depicts the 3 types of schemas in accordance with an aspect of the present invention.
Figure 1:
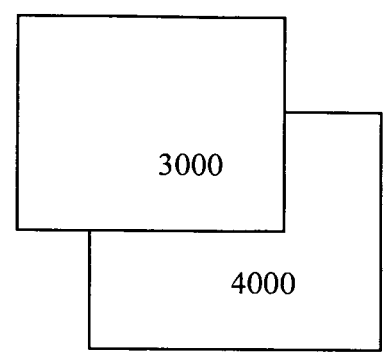

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or physical propagation medium. More specific examples (a nonexhaustive list) of the computer-usable or computer-readable medium would include the following: a physical electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a physical transmission media such as those supporting the Internet or an intranet, or a magnetic storage device. Note that the computer-usable or computer-readable medium could even be paper or another suitable physical medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any physical medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In this document, XML is used as the text format for the canonical form. However, it is clear to a person skilled in the art how alternative text forms may be used. XML Schema provides three elements for annotating schemas for the benefit of both human readers and applications: annotation, documentation and appInfo. The documentation element is typically the location for human readable material. The appInfo element is usually used to provide information for tools, stylesheets and other applications. In this invention, the appInfo element is used to bear application specific information (known hereafter as "ASI"). Both documentation and appInfo appear as subelements of annotation in XML documents.

An aspect of the present invention revolves around providing a mechanism to support dynamic contribution of XML schema describing the contents of appInfo tags. Since schema can be contributed that describes the contents of the appInfo tag, a tooling framework can now generically support rich editing and validation of application specific information. Presently there is no prescribed way of dynamically providing information about the content of the appinfo tag to a tooling framework for rich editing or validation. The user of a tool can add any well formed content to the appInfo. The graphical interface can only have minimal user interface support such as a text field, and validate whether its content is well formed.

In accordance with an aspect of this invention, FIG. 1 illustrates the 3 classes of schema included in a framework, denoted as exemplary emdSchema 2000, eisSchemas 3000 4000, and businessObjectSchema 5000. The business object schema 5000 (businessObjectSchema) describes business object in the EIS, specifies the ASI set that applies, and contains EIS ASI instances (XML elements). An enterprise information system schema 3000 4000 ("eisSchema") describes the format and shape of ASI that can be used in a business object schema. There can be more than one eisSchema 3000 4000. Finally, an enterprise metatdata discovery schema 2000 ("emdSchema") specifies the precise syntax of anchor points for schemas 3000 4000 5000 of the other two types. Each of these will be discussed in greater detail below. FIGS. 2A, 2B, 3, 4, and 5A to 5F illustrate sample schema documents for a purchase order business application.

There are two notions of anchor points in this invention relating to an emdSchema 2000. The first being able to anchor:
  application specific information schema to complexTypes;
  application specific information schema to elements; and
  application specific information schema to attributes.

The second notion of anchor points concerns the ability of anchoring the above set of schema 3000 4000 to a business object schema 5000. Thus, the schema 2000 specifies which ASI schemas 3000 4000 (eisSchema) should be used to support editing and validating of ASI.

FIGS. 2A and 2B show, when taken together, an exemplary emdSchema 2000 with both anchoring of a set of ASI Schema 3000 4000 in a first section 2A and anchoring of the complexType, element, or attribute of eisSchema 3000 4000 in a second section 2B.

The anchoring of a set of eisSchema 3000 4000 (in section A) is annotated as appInfo on the schema element declaration in the corresponding businessObjectSchema 5000. The namespace of the eisSchema 3000 4000 is identified in the exemplary businessObjectSchema 5000 using the attribute name asiNSURI of the emdSchema 2000. An optional asiSchemaLocation attribute can also be used in the businessObjectSchema 5000 to identify the location of the eisSchema 3000 4000.

The anchoring of the complexType, element, or attribute of the eisSchema 300 400 is specified as appinfo on global elements in the eisSchema 3000 4000. The global element's type describes the ASI (ASI may also reside on global complexTypes). In the exemplary emdSchema 2000, a complexType element annotationType is defined as comprising 2 attributes, annotationKind and annotationScope. The former specifies the kind of annotation anchor (one of complexType, element or attribute), associating the ASI being described to the schema component it can be used with. The attribute annotationScope specifies the scope of the annotationKind as applicable to local or global constructs of the schema, or both. This latter attribute is optional: if specified, the ASI is so scoped to either be used on local or global declarations (or possibly both) in the business object schema; if unspecified, then the ASI can be used on either declaration. This annotation provide an anchor point to determine and validate which global element declaration defined in the ASI schema can appear as annotations on local or global element, complex types and attributes declarations on the business object schema. In FIGS. 3 an 4, the annotationScope is set to local for all types (ElementASI and AttributeASI). Therefore, all instances of these types can appear only on local element declarations (as part of complexTypes) on the Business object schema.

It is possible to define multiple declarations in an eisSchema which have identical annotationTypes. In this case multiple appInfo's can appear on the same declaration in the business object schema.

Although both types of anchoring are shown to reside in the same emdSchema 2000, it is clear to a person skilled in the relevant art that these may also be contained in 2 separate schema files, one for each type of anchoring.

The provided ASI schema (also known as enterprise information schema or eisSchema) must describe the application specific information that can occur on a complexType, element, or attribute. All annotations within the appInfo tag are disambiguated with the source attribute tag set to the namespace URI of the annotating schema. For example, in FIGS. 3 and 4, the source tag is set to source="="http://commonj.emd/asi" which is the namespace URI of the framework's schema.

A set of schema that applies to a business object may have more than one eisSchema for complexTypes, elements, or attributes. For example, there may be two ASI declarations for what can be stored on elements. FIGS. 3 and 4 present 2 sample eisSchema 3000 4000 for the sample emdSchema 2000 file shown in FIGS. 2A to 2B.

An enterprise information system may have more than one set of ASI schemas. For example, application specific information may differ between SAP RFC and SAP BAPI.

In use, Enterprise Information system (EIS) vendors or Internet Service Vendors (ISVs) building Adapters for the EIS systems can create ASI schemas pertaining to a particular EIS domain, i.e. eisSchema schemas. This invention does not mandate any structure or contents of the types pertaining to global elements defined in an ASI schema. The instances of global element declarations defined in ASI schemas appear as annotations on the business object.

The schema declarations in the business object schema have to be annotated with global element declarations with an instance annotationSet element declaration defined in emdSchema. This annotation provides an anchor point to determine (see FIG. 5A):

the namespace URI of the ASI schema (asiNSURI);

Optionally, the location where ASI schema(s) can be found. An embodiment of this invention may have separate facility to locate an ASI schema given a name space URI (e.g. XML catalog facility available in Websphere Application Development); in such case the asiSchemaLocation attribute does not have to be present; and ASI annotations on the business object schema which are of interest to a metadata Editor. The metadata Editor has all the pertinent information (schema definition of describing the shape/structure of the annotation through ASI schema) to provide a rich editing experience. In exemplary businessObjectSchema 5000, two ASI schemas are identified to the editor: eis1Schema.xsd having asiNSURI=http://www.eis1.com/asi, and eis2Schema.xsd having asiNSURI="http://www.eis2.com/asi".

The instances of global element declarations defined in eisSchema can appear as annotations on the business object schema element, complex type, attribute declarations. These instances are validated against the global element declaration defined in ASI schema using standard XML schema validation facilities. Also, additional validation checks are typically performed to ensure that only those declarations of global elements which were annotated with framework schema appear on the respective declarations in the business object schema. For example ElementASI element declaration in exemplary eisSchema 3000 was marked to appear on local element types only; it would be result in a validation error if it had appeared on say a global element type or a complex type declaration.

As mentioned before, all annotations within the appInfo tag are disambiguated with the source attribute tag set to namespace URI of the annotating schema—in this it would be namespace URI of ASI schema. For example, the shipTo element in exemplary businessObjectSchema 5000 has 2 ASI specific annotations, one pertaining to ASI schema having namespace URI http://www.eis1.com/asi and the other pertaining to ASI schema having namespace URI http://www.eis2.com/asi.

A business object schema may apply to more than one enterprise information system such as SAP and PeopleSoft. Each EIS would supply its own eisSchema. Each of the ASI schema is used by an application to map the business object into its corresponding enterprise entity.

One embodiment of this invention is a tooling framework that works with one or more EIS and uses schema files to describe its type information. A type editor in the framework would provide rich editing support and a validator can check that the ASI in the business object schema is valid.

In essence, a computer system implements an application development environment (tooling framework) in accordance with the present invention. A user of the framework adopts one or more ASI schema and emdSchema and produces in turn a business logic schema. This business logic schema can then be used to generate interface code (e.g. in Java or C++) that can be invoked from code which makes use of services. The tooling system has a user interface (UI) as part of an editor (with possibly drag and drop capability) and is connected to underlying database(s), which permits producing, storing and manipulating metadata objects; at each step being guided by the rules prescribed by the emdSchema and esiSchema. The database stores emdSchemas, typically part of the framework (supplied as part of the tooling system), and one or more eisSchema may either be stored in the database or retrieved from another source (such as the EIS system).

Another embodiment of the schema which describes the anchor points for the ASI is a specification that the tooling frameworks would conform to. This would enable EIS providers to implement support for ASI that could then plug into any conforming tooling framework.

The computer system may be any type of computerized system. Data and other information required to practice the present invention can be stored locally to the computer system (e.g., in a storage unit), and/or may be provided over a network. Storage unit can comprise any system capable of providing storage for data and information under the present invention. As such, storage unit may reside at a single physical location, comprising one or more types of data storage, or may be distributed across a plurality of physical systems in various forms. In another embodiment, each storage unit may be distributed across, for example, a local area network (LAN), wide area network (WAN) or a storage area network (SAN).

Network is intended to represent any type of network over which data can be transmitted. For example, network can include the Internet, a wide area network (WAN), a local area network (LAN), a virtual private network (VPN), a WiFi network, a personal area network (PAN), or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

The computer system generally includes a processing unit, memory, bus, input/output (I/O) interfaces and external devices/resources. Processing unit may comprise a single processing unit, or may be distributed across one or more processing units in one or more locations, e.g., on a client and server. Memory may comprise any known type of data storage and/or transmission media, including magnetic media, optical media, random access memory (RAM), read-only memory (ROM), etc. Moreover, similar to processing unit, memory may reside at a single physical location, comprising one or more types of data storage, or be distributed across a plurality of physical systems in various forms.

It should be appreciated that the teachings of the present invention can be offered as a business method on a subscription or fee basis. For example, the tooling framework could be created, maintained, supported, and/or deployed by a service provider that offers the functions described herein for customers. That is, a service provider could be used to provide the debugging capabilities of the tooling framework, as described above.

As will be appreciated by those skilled in the art, modifications to the above-described embodiment can be made without departing from the essence of the invention. For example, the above schemas have been in the XML form; other markup languages such as SGML may also be used in embodiments of this invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method for producing interface code to use services of an enterprise information system, comprising:
   providing, with circuitry in an interface module, an application specific information schema defining application specific information usable in business objects of the enterprise information system;
   providing, with said circuitry of said interface module, an enterprise metadata discovery schema configured to:
      classify individual elements in said application specific information schema as at least one of a complex type recognized by said enterprise information system, an element recognized by said enterprise information system, and an attribute recognized by said enterprise information system; and
      anchor said classified individual elements in said application specific information schema to elements usable in a business object schema; and
   generating a business object schema from said anchored individual elements in said application specific information schema with circuitry in a metadata editor module; and
   generating the interface code with said circuitry of said interface module using the business object schema.

2. The method of claim 1, wherein the enterprise metadata discovery schema and the application specific information schema are used for rich editing of the business object schema.

3. The method of claim 1, further comprising providing a second application specific information schema for providing further services of the enterprise information system.

4. The method of claim 1, further comprising providing at least one further application specific information schema for providing services of a second enterprise information system.

5. The method of claim 1, wherein a format and shape of the application specific information usable in a business object schema for the enterprise information system is defined in the application specific information schema as application specific information that can occur as any complexType, element and attribute.

6. The method of claim 1, wherein all schemas are in XML.

7. The method of claim 6, wherein the anchoring by the enterprise metadata discovery schema comprises annotations.

8. A system for producing interface code to use services of an enterprise information system, comprising:

memory circuitry comprising an application specific information schema stored thereon, said application specific information schema defining application specific information usable in business objects for the enterprise information system;

memory circuitry comprising an enterprise metadata discovery schema stored thereon, said enterprise metadata discovery schema being configured to:
      classify individual elements in said application specific information schema as at least one of a complex type recognized by said enterprise information system, an element recognized by said enterprise information system, and an attribute recognized by said enterprise information system; and
      anchor said classified individual elements in said application specific information schema to elements usable in a business object schema;

a metadata editor module configured to generate a business object schema from said anchored individual elements in said application specific information schema; and a generator module for generating the interface code using the business object schema.

9. The system of claim 8, wherein the enterprise metadata discovery schema and the application specific information schema are used for rich editing of the business object schema.

10. The system of claim 8, further comprising a second application specific information schema for providing further services of the enterprise information system.

11. The system of claim 8, further comprising at least one further application specific information schema for providing services of a second enterprise information system.

12. The system of claim 8, wherein a format and shape of the application specific information usable in a business object schema for the enterprise information system is defined in the application specific information schema as application specific information that can occur as any complexType, element and attribute.

13. The system of claim 8, wherein all schemas are in XML.

14. The system of claim 13, wherein the anchoring performed by the enterprise metadata discovery schema comprises annotations.

15. A computer program product for producing interface code to use services of an enterprise information system, the computer program product comprising:

a computer storage medium having computer executable program code embodied therein, the computer executable program code comprising:
      computer executable program code configured to provide an application specific information schema defining application specific information usable in business objects of the enterprise information system;
      computer executable program code configured to provide an enterprise metadata discovery schema configured to:
         classify individual elements in said application specific information schema as at least one of a complex type recognized by said enterprise information system, an element recognized by said enterprise information system, and an attribute recognized by said enterprise infoimation system; and
         anchor said classified individual elements in said application specific information schema to elements usable in a business object schema; and
      computer executable program code configured to generate a business object schema from said anchored individual elements in said application specific information schema using a metadata editor; and
      computer executable program code configured to generate the interface code using the business object schema.

* * * * *